United States Patent Office.

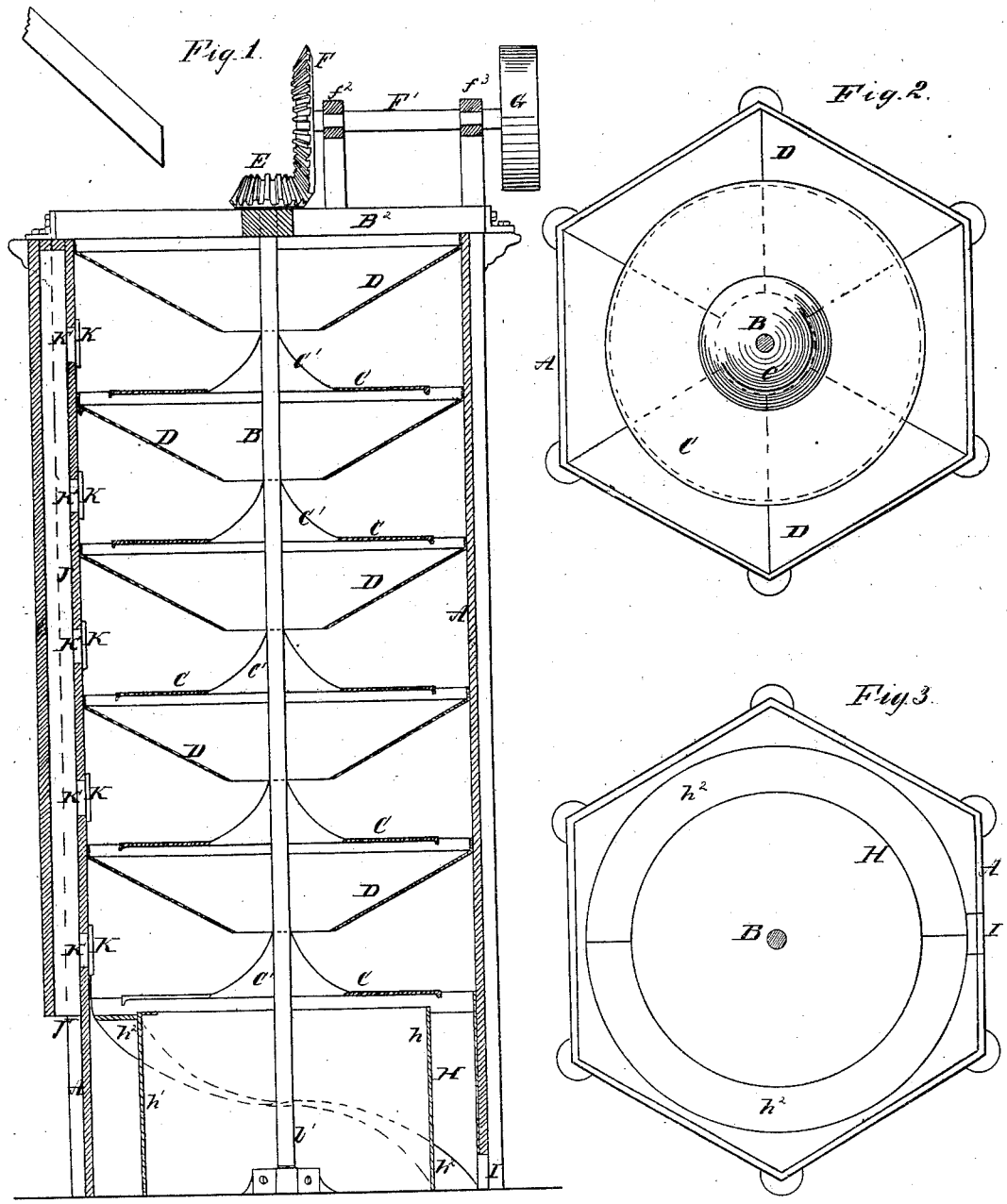

ROBT. HENEAGE, OF BUFFALO, NEW YORK, ASSIGNOR TO HIMSELF AND SYLVANUS O. GOULD.

IMPROVEMENT IN GRAIN-DRIERS.

Specification forming part of Letters Patent No. 49,626, dated August 29, 1865.

*To all whom it may concern:*

Be it known that I, ROBERT HENEAGE, of the city of Buffalo, county of Erie, and State of New York, assignor to myself and SYLVANUS O. GOULD, have invented a new and Improved Centrifugal and Vertical Grain Drier and Scourer; and I do hereby declare that the following is a full, clear, and exact description of the construction and operation thereof, reference being had to the accompanying drawings, making a part of this specification, in which—

Figure I is a vertical section of my improved grain drier and scourer. Fig. II is a plan of one disk and hopper. Fig. III is a plan of the spiral discharge-hopper of the same.

The nature of this invention consists, first, in the combination and arrangement of a number of disks upon a vertical shaft, the center of said disks being elevated in the shape of a concave cone, and an equal number of hoppers or inverted cones, one placed beneath each disk, in a manner that the grain may be passed alternately through a hopper and over a disk, the inverted cones or hoppers concentrating the grain in the center around the vertical shaft, and the revolving disks, by their centrifugal force, spreading the grain over its surface and discharging it over the edge or periphery of the disks into the next hopper below, and so on, thereby securing a constant motion to the grain, passing over and through ten or more consecutive disks and hoppers; second, in the arrangement and combination, with a centrifugal and vertical grain-drier, of a spiral discharge hopper or conductor at the bottom thereof, by which means the whole of the dried and scoured grain is discharged from the drier through one opening.

Letters of like name and kind refer to like parts in each of the figures.

A represents a tower or chamber, in which the operating machinery is contained. It may be constructed of iron or brick, and may be made either round or in hexagon shape.

B is a vertical shaft extending through the center of the tower, one end resting in journal-boxes at the bottom of the tower, as shown at $b'$, and the other end having bearings on cross-timbers, $B^2$, fastened across the top of the tower.

C C are a series of disks placed at equal distances upon the vertical shaft B. They are of circular form, their periphery not quite reaching the walls or sides of the tower. A concave cone is formed upon each disk around the shaft, as shown at $C'$.

D D are stationary hoppers or receivers, which are of ordinary construction, and are bolted or otherwise fastened to the sides or walls of the tower, one hopper being placed below each disk for the purpose of catching the grain as it is discharged from one disk and concentrating it around the shaft and passing it onto the center of the disk below.

E is a bevel-pinion, keyed upon the top end of the vertical shaft B and meshing with a bevel-wheel, F, upon the horizontal shaft $F'$, which shaft is supported in bearings $f^2 f^3$ fastened to the cross-timbers $B^2$. A driving-pulley, G, is keyed onto the free end of the shaft $F'$, by which motion is given through the bevel-gears E F to the vertical shaft B.

H represents a spiral discharge-hopper at the bottom of the tower A, which is of peculiar construction. There is a cylinder formed within the outer walls of the tower and beneath the lowest disk, the diameter of which cylinder is less than the diameter of the disk above, and is shown at $h'$. This cylinder, with the outer wall, forms a circular chamber, the bottom of which is composed of two spirally-inclined planes, $h^2$, their upper ends meeting near the top of the cylinder $h'$ and their lower ends at the bottom thereof and opposite. An opening, I, is made through the outer wall for the egress of the grain.

Hot air is introduced into the whole apparatus by means of a hot-air-supply chamber, J, of ordinary construction, which is erected upon one side of the tower and reaches to the top thereof. Connection is made with a hot-air furnace of any suitable description at $J'$, and the supply of hot air may be regulated by the slides K, covering the openings $K'$, in a common manner. One opening is made above each disk, as shown.

Operation: Hot air being admitted into the tower A, the grain is spouted into the uppermost hopper, it being elevated to the necessary height for that purpose. The grain will immediately drop through the opening of the hopper onto the center of the uppermost disk, which disk, being revolved by means of the bevel-gears E F, by its centrifugal force spreads the grain over its entire surface and drops it from its periphery into the hopper below. The concave cone formed upon the center of the disk assists materially in equalizing the motion of the grain from the center to the periphery of the disk. The hopper below again concentrates the falling grain around the shaft B and presents it to the second disk, for the purpose of spreading it again over the surface thereof by means of its centrifugal force. After passing through ten or more hoppers and over the same number of disks, the wet grain becomes completely dried, scoured, and brightened, and is made through such operation a marketable article.

The advantages of this grain-drier are numerous. It is cheap in construction, having very little machinery necessary to operate it, and may be located at any place where it is needed, as by varying the diameter of the disk, or the dimensions of the hoppers, or the number of both, it is an easy matter to construct one of these grain-driers within almost any convenient compass.

What I claim as my invention, and desire to secure by Letters Patent, is—

The arrangement of the perforated disks C, provided with the cones $c'$ and secured seriately upon the shaft B, with the conical perforated hoppers D, for the purpose of distributing the grain to and from the center of the machine, the several parts being constructed in the manner specified.

ROBT. HENEAGE.

Witnesses:
C. C. BRISTOL,
CASPER J. DRESCHER.